United States Patent
Aoki

(10) Patent No.: US 7,751,708 B2
(45) Date of Patent: Jul. 6, 2010

(54) OPTICAL SWITCHING TRANSMISSION SYSTEM WITH TIMING CORRECTION

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 11/651,530

(22) Filed: Jan. 10, 2007

(65) Prior Publication Data

US 2007/0166035 A1 Jul. 19, 2007

(30) Foreign Application Priority Data

Jan. 11, 2006 (JP) .............................. 2006-003834

(51) Int. Cl.
*H04J 14/00* (2006.01)
(52) U.S. Cl. .......................................... 398/54; 398/47
(58) Field of Classification Search .................. 398/47, 398/52–54
See application file for complete search history.

(56) References Cited

U.S. PATENT DOCUMENTS

| 4,912,706 | A | 3/1990 | Eisenberg et al. |
| 6,973,270 | B2 * | 12/2005 | Yokoyama et al. ............ 398/57 |
| 7,526,203 | B2 * | 4/2009 | Tamil ............................ 398/54 |
| 2007/0223921 | A1 * | 9/2007 | Sone et al. ...................... 398/45 |
| 2008/0159748 | A1 * | 7/2008 | Sone et al. ..................... 398/154 |

OTHER PUBLICATIONS

Patent Abstracts of Japan, Publication No. 02-186898, Published Jul. 23, 1990.

* cited by examiner

*Primary Examiner*—Nathan M Curs
(74) *Attorney, Agent, or Firm*—Fujitsu Patent Center

(57) ABSTRACT

An optical transmission system capable of time difference correction without lengthening guard times, thereby improving optical packet transmission efficiency. A switching processor sets identical switching timing for input ports thereof such that signals input from the input ports are switched at the same timing. When an optical dummy packet is received, the switching processor switches the optical dummy packet to be returned to the originating node. A time difference corrector detects synchroneity of the switched and looped-back optical dummy packet and, if asynchronism is detected, varies readout timing until synchroneity is attained, thereby correcting the time difference so that the optical dummy packet may fit in the switching time range and thus can be switched normally.

6 Claims, 11 Drawing Sheets

OPTICAL SWITCHING TRANSMISSION SYSTEM WITH TIMING CORRECTION

CROSS-REFERENCE TO RELATED APPLICATIONS

This application is based upon and claims the benefits of priority from the prior Japanese Patent Application No. 2006-003834, filed on Jan. 11, 2006, the entire contents of which are incorporated herein by reference.

BACKGROUND OF THE INVENTION

1. Field of the Invention

The present invention relates to optical transmission systems, and more particularly, to an optical transmission system for performing optical switching to transmit optical packets.

2. Description of the Related Art

In recent years, technology called optical interconnect has been researched and developed. Optical interconnect is a generic term referring to optical data communications over very short distances and usually signifies optical communications over shorter distances than LANs.

Optical interconnect is roughly classified into three types of optical interconnection, that is, optical interconnection between devices (such as communication between personal computers), optical interconnection between boards (communication between printed boards), and optical interconnection within a board (communication within a printed board). Conventional metal interconnection is associated with problems such as transmission loss or constraints on transmission bandwidth, but by using optical fibers, attenuation of signal strength and transmission bandwidth can be remarkably improved.

Meanwhile, the performance of CPUs has been noticeably advancing in recent years. There is, however, a considerable gap between the rate of advancement of LSI chips such as CPUs and that of peripheral technology associated with electrical wiring on printed boards. Also, with the rapid, unceasing improvement in the performance of LSI chips, the number of input/output pins necessary for exchanging signals has become as large as several thousands.

With techniques deriving from the current electrical wiring technology, it is impossible to cope with such an enormous number of pins. For this reason, in-board optical interconnect has been attracting attention as a breakthrough in solving the problem of wiring bottleneck.

Because of the wide transmission band characteristic, application of optical interconnect to other fields is also pursued, such as signal switching in a parallel computer system including supercomputers connected to one another or in high-speed routers, in order to avoid the bottleneck (bandwidth or resources) of the electrical wiring technology.

Many of optical interconnect systems introduced until now adopt switching techniques in which optical signals are once converted to electrical signals for switching. With this configuration, however, broadening of the bandwidth entails increase in the number of switching ports. Accordingly, attempts are being made to realize optical packet switches whereby optical signals are directly switched, thereby to reduce the scale of switches.

As conventional optical switch-related techniques, a technique of synchronizing an optical communication network to lessen variations in frame reception timing of a node has been proposed (e.g., Japanese Unexamined Patent Publication No. 02-186898 (pages 646 to 648, FIG. 5)).

Where optical packet switching is performed on the optical interconnect system, optical packets arrive at the individual input ports of the optical switch at different times.

A buffer element (delay element) capable of retaining an optical packet in optical form and compensating for an arbitrary arrival time difference does not exist. Conventionally, therefore, in order to correct the arrival time difference of transferred packets, a guard time is used in conjunction with the optical packet transfer control. However, the guard time is a non-transmission time period containing no information, and since the guard time is lengthened with increase in the arrival time difference, a problem arises in that the optical packet transmission efficiency noticeably lowers.

FIG. 11 illustrates the problem caused by the arrival time difference of optical packets. An optical transmission system 5 includes transmitters 51 to 53, receivers 54 to 56, and an optical switch 57. Optical packets transmitted from the transmitters 51 to 53 are switched by the optical switch 57 to be sent to the receivers 54 to 56. Each of the optical packets transmitted from the transmitters 51 to 53 has guard times provided at the head and tail thereof.

The optical switch 57 switches, at identical switching timing, optical packets input thereto from its individual ports. In FIG. 11, rectangular forms indicated by the dashed lines illustrate a packet switching process performed at the same switching timing irrespective of input ports, wherein the optical packets are switched at timing t1 and are output at timing t2.

The optical packet p1 transmitted from the transmitter 51 fits in the timing t1, including the guard time provided at each end thereof. Accordingly, the optical packet p1 is normally switched at the timing t1 and output at the timing t2 to the receiver 54.

On the other hand, the optical packet p2 transmitted from the transmitter 52 arrives at the optical switch 57 after a delay of time d1, compared with the optical packet p1, so that only the former part of the payload of the optical packet p2 fits in the timing t1, with the latter part of the payload being left behind. Consequently, only the former part of the payload is switched and is output to the receiver 55 at the timing t2.

The optical packet p3 transmitted from the transmitter 53 arrives at the optical switch 57 earlier than the optical packet p1 by time d2, so that only the latter part of the payload of the packet p3 fits in the timing t1, with the former part of the payload being left out. Thus, only the latter part of the payload is switched and is output to the receiver 56 at the timing t2.

In order for the optical packets p2 and p3 to be switched normally without any part of their payloads being lost, it is necessary that the payloads of the individual optical packets be shortened in advance to secure longer guard time intervals.

Thus, in the conventional configuration of the optical transmission system 5, where the arrival time difference of optical packets is large relative to the switching timing of the input ports of the optical switch 57, the guard time interval for correcting the arrival time difference needs to be set long, and since a longer guard time interval entails a corresponding decrease in the transmittable amount of data, a problem arises in that the data transfer efficiency lowers.

SUMMARY OF THE INVENTION

The present invention was created in view of the above circumstances, and an object thereof is to provide an optical transmission system whereby, even in cases where an arrival time difference of optical packets is large, it is possible to correct the arrival time difference without prolonging guard times, thereby improving optical packet transmission efficiency.

To achieve the object, there is provided an optical transmission system for performing optical switching to transmit optical packets. The optical transmission system comprises an optical switch node and a terminal node. The optical switch node includes a switching processor, and the switching processor sets identical switching timing for all input ports thereof such that signals input from the input ports are switched at the identical switching timing. When an optical dummy packet is received, the switching processor switches the optical dummy packet at the set switching timing to be returned to an originating node which originated the optical dummy packet, and when an optical continuous signal is received, the switching processor samples the optical continuous signal at the set switching timing and returns an optical dummy packet sampled thereby to an originating node which originated the optical continuous signal. The terminal node includes a dummy packet memory for generating and storing a dummy packet, which is an electrical signal, during initial setting executed on connection of the terminal node with the optical switch node, an optical dummy packet transmitter for transmitting the optical continuous signal to the optical switch node during the initial setting or, when the optical dummy packet is to be transmitted to the optical switch node during the initial setting, reading out the dummy packet at readout timing from the dummy packet memory, converting the read dummy packet to an optical signal to generate again the optical dummy packet, and transmitting the generated optical dummy packet to the switching processor, a dummy packet receiver for receiving the switched optical dummy packet and converting the received optical dummy packet to the dummy packet which is an electrical signal, and a time difference corrector for detecting synchroneity of the switched and looped-back optical dummy packet and, if asynchronism is detected, varying the readout timing until synchroneity is attained, thereby correcting a time difference such that the optical dummy packet is synchronized with the switching timing. During in-service operation, the terminal node transmits optical packets to the switching processor by using the readout timing obtained after the time difference correction.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
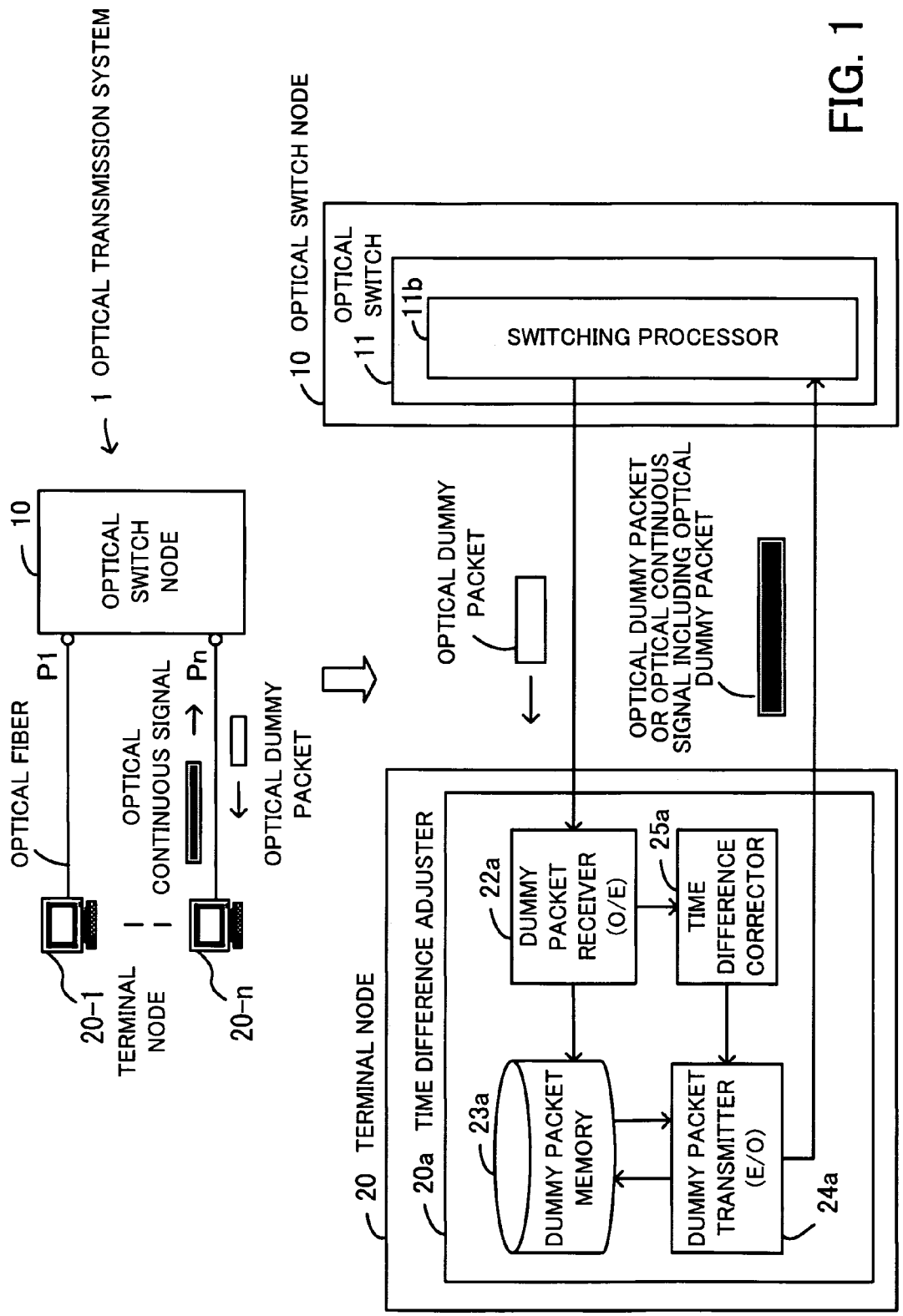
FIG. 1 illustrates the principle of an optical transmission system.

Preferred embodiments of the present invention will be described below with reference to the accompanying drawings, wherein like reference numerals refer to like elements throughout. FIG. 1 illustrates the principle of an optical transmission system. The optical transmission system 1 is a system to which optical interconnect is applicable, and includes an optical switch node 10 and terminal nodes 20-1 to 20-n(when referred to generically, "terminal node 20") each connected to the optical switch node 10 by an optical fiber. An optical packet output from a certain terminal node is switched directly in the form of an optical signal by the optical switch node 10 and transmitted to a predetermined terminal node.

The optical switch node 10 has an optical switch 11 including a switching processor 11b. The switching processor 11b sets identical switching timing for all input ports P1 to Pn, and accordingly, signals input from the input ports P1 to Pn are switched at the same timing.

Also, when optical dummy packets are received from the terminal nodes 20-1 to 20-n, the switching processor 11b switches the optical dummy packets at the set switching timing so as to be returned to their originating terminal nodes. Further, when an optical continuous signal is received, the switching processor 11b samples the optical continuous signal at the set switching timing and returns optical dummy packets sampled thereby to the originating terminal node. The manner of how optical dummy packets generated from the optical continuous signal are returned will be explained later with reference to FIG. 2.

The terminal node 20 (corresponding to a supercomputer or the like) includes a time difference adjuster 20a, which comprises a dummy packet receiver (O/E) 22a, a dummy packet memory 23a, an optical dummy packet transmitter (E/O) 24a and a time difference corrector 25a.

The dummy packet receiver 22a receives the switched optical dummy packet and converts the received packet to a dummy packet which is an electrical signal (the optical dummy packet is an optical signal, while the dummy packet is an electrical signal). The dummy packet memory (buffer) 23a generates and stores dummy packets.

The optical dummy packet transmitter 24a transmits an optical continuous signal to the optical switch node 10 during initial setting. Alternatively, when transmitting an optical dummy packet to the optical switch node 10 during the initial setting, the optical dummy packet transmitter 24a reads out the dummy packet from the dummy packet memory 23a at readout timing, converts the read dummy packet to an optical signal to generate an optical packet, and transmits the generated optical packet to the optical switch 11.

The time difference corrector 25a detects synchroneity of the optical dummy packet which has been switched and looped back. If asynchronism is detected, the time difference corrector 25a varies the readout timing until synchroneity is attained, thereby correcting the time difference so that the optical dummy packet may fit in the switching time range of the optical switch 11 and thus can be switched normally.

In subsequent in-service operation of the system following the time difference correction, normal optical transmission is carried out wherein optical packets (packets containing actual service information, as distinct from the optical dummy packets) are transmitted to the optical switch 11 by using the corrected readout timing.

Figure 2:
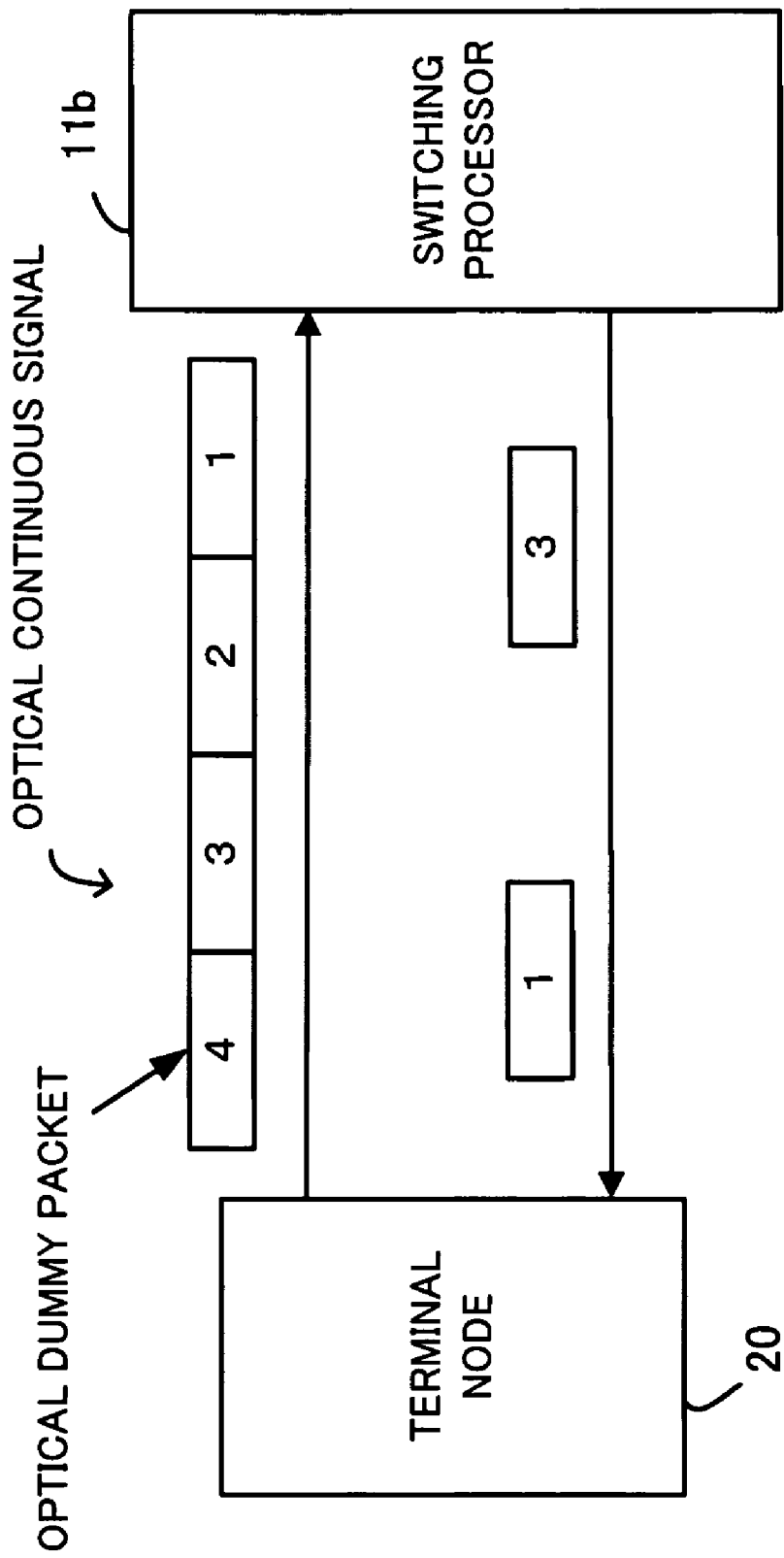
FIG. 2 shows the manner of how optical dummy packets generated from an optical continuous signal are returned.

FIG. 2 illustrates the manner of how optical dummy packets generated from the optical continuous signal are returned. The optical continuous signal transmitted from the terminal node 20 is returned at specified switching timing (in the figure, at times 1 and 3) to the terminal node 20 by the switching processor 11b. If there is a difference between the switching timing of the switching processor 11b and the input timing at which the optical continuous signal constituted by multiple optical dummy packets is input to the switching processor 11b, an optical dummy packet of which the head or the tail has been lost due to the switching action is returned, whereupon the terminal node 20 detects the asynchronism and carries out time difference correction, described later.

Figure 3:
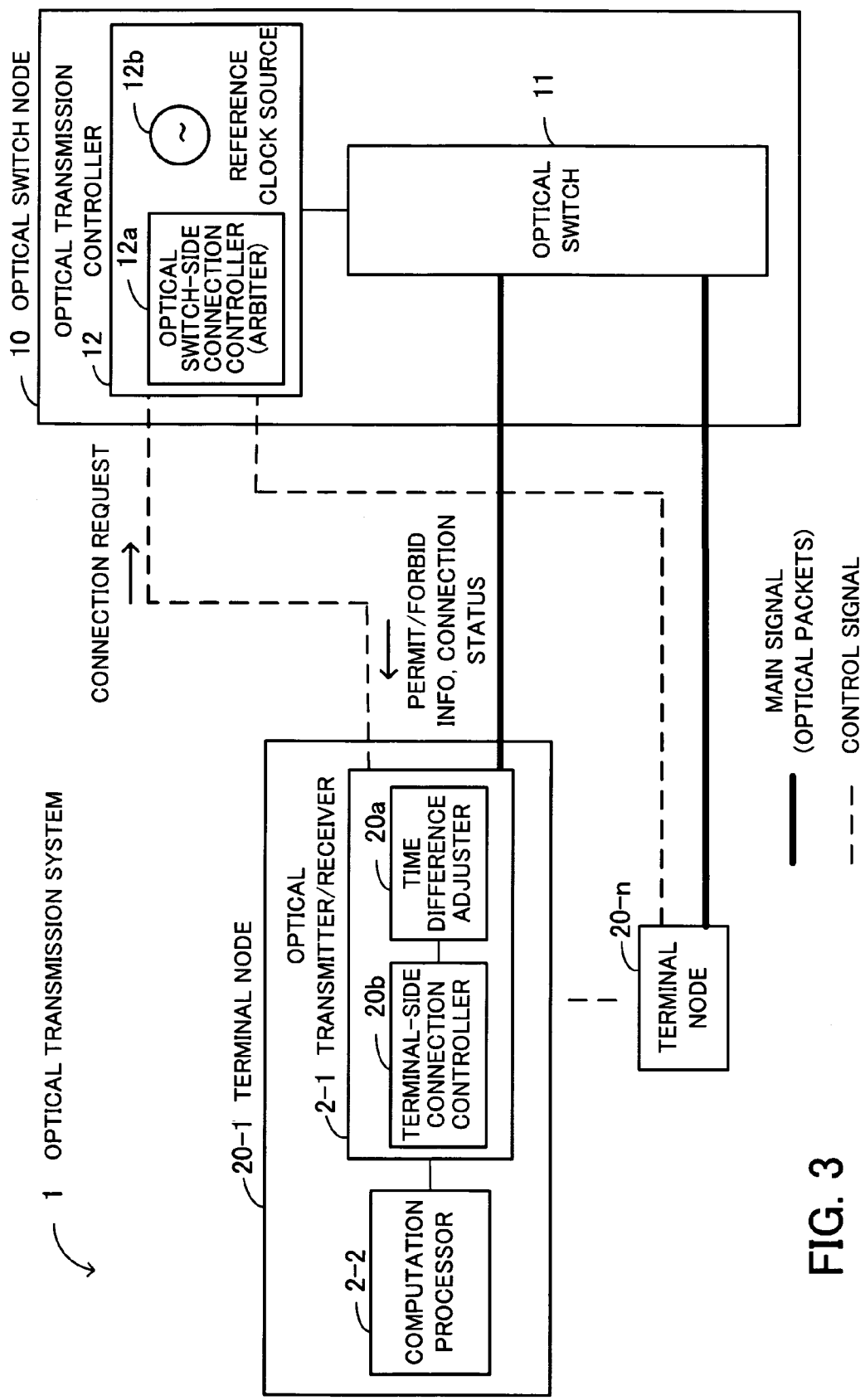
FIG. 3 shows an entire configuration of a system including an optical switch node and terminal nodes.

An entire configuration of the system including the optical switch node 10 and the terminal node 20 will be now described with reference to FIG. 3. The terminal nodes 20-1 to 20-n are each connected to the optical switch node 10 by an optical fiber, as shown in FIG. 1, and optical packets, which are a main signal, and a control signal are exchanged between each of the terminal nodes 20-1 to 20-n and the optical switch node 10 via the optical fiber (the control signal may alternatively be exchanged via an electric cable laid separately from the optical fiber).

The optical switch node 10 comprises the optical switch 11, also shown in FIG. 1, and an optical transmission controller 12. The optical transmission controller 12 includes an optical switch-side connection controller 12a (hereinafter referred to as arbiter 12a) and a reference clock source 12b, and globally controls the system constituted by the optical switch 11 and the terminal nodes 20-1 to 20-n (the control includes centralized control of optical packet routing information).

The arbiter 12a takes care of port-to-port connection between the optical switch node 10 and each of the terminal nodes 20-1 to 20-n, as well as drive control of the optical switch 11. The reference clock source 12b is a master clock of the system, and a clock signal generated by the reference clock source 12b is distributed to the terminal nodes 20-1 to 20-n and the optical switch 11, so that the individual elements in the system operate in synchronism with the distributed clock signal.

The terminal node 20 comprises an optical transmitter/receiver 2-1 and a computation processor 2-2. The optical transmitter/receiver 2-1 includes the time difference adjuster 20a, also shown in FIG. 1, and a terminal-side connection controller 20b. The optical transmitter/receiver 2-1 is configured like a line card, for example, and can be freely inserted into and detached from the terminal nodes 20-1 to 20-n.

The computation processor 2-2 has a user interface and acts as a central computer of the terminal node 20 for performing various information processing. The terminal-side connection controller 20b takes care of port-to-port connection between the terminal node to which it belongs and the optical switch node 10. The time difference adjuster 20a is explained above with reference to FIG. 1, and therefore, explanation thereof is omitted.

The following summarizes the port-to-port connection between the terminal node 20 and the optical switch 11. At the time of initial setting prior to in-service operation, the terminal-side connection controller 20b transmits a port-to-port connection request to the arbiter 12a. On receiving the connection request from any of the ports (terminal nodes), the arbiter 12a decides a connection route based on the connection request, and sends port connection permit/forbid information to the terminal-side connection controller 20b of the corresponding terminal node.

The terminal-side connection controller 20b receives the port connection permit/forbid information and, if the port connection is permitted, transmits optical packets from the permitted port to the optical switch 11. The arbiter 12a notifies each terminal node of the currently established port-to-port connection status, and also controls the switching operation of the optical switch 11 such that switching of all input ports of the optical switch 11 takes place at the same timing.

The following describes the time difference correction performed by the time difference adjuster 20a prior to in-service operation of the system, in order to correct the time difference between the timing of arrival at the optical switch 11 of optical packets transmitted from the terminal node 20 and the switching timing.

Figure 4:
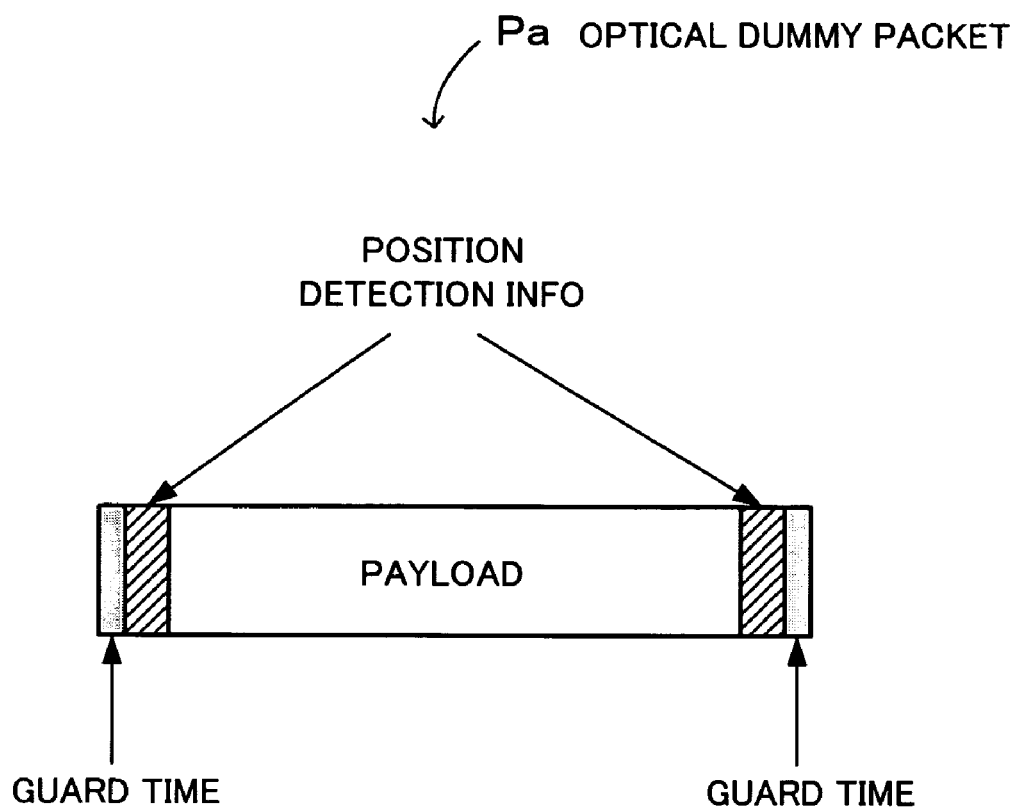
FIG. 4 shows the structure of the optical dummy packet.

FIG. 4 shows the structure of the optical dummy packet. The optical dummy packet Pa carries optical dummy packet position detection information at each of the head and tail of the payload, to enable detection of synchroneity of the optical dummy packet Pa. Also, guard times are provided so as to precede and succeed, respectively, the corresponding optical dummy packet position detection information (each guard time is a very short interval added in order to compensate for fine jitters of data and is different from the conventional long-interval guard time provided for time difference correction). The optical dummy packet position detection information and the guard times are added by the optical dummy packet transmitter 24a (FIG. 1).

Figure 5:
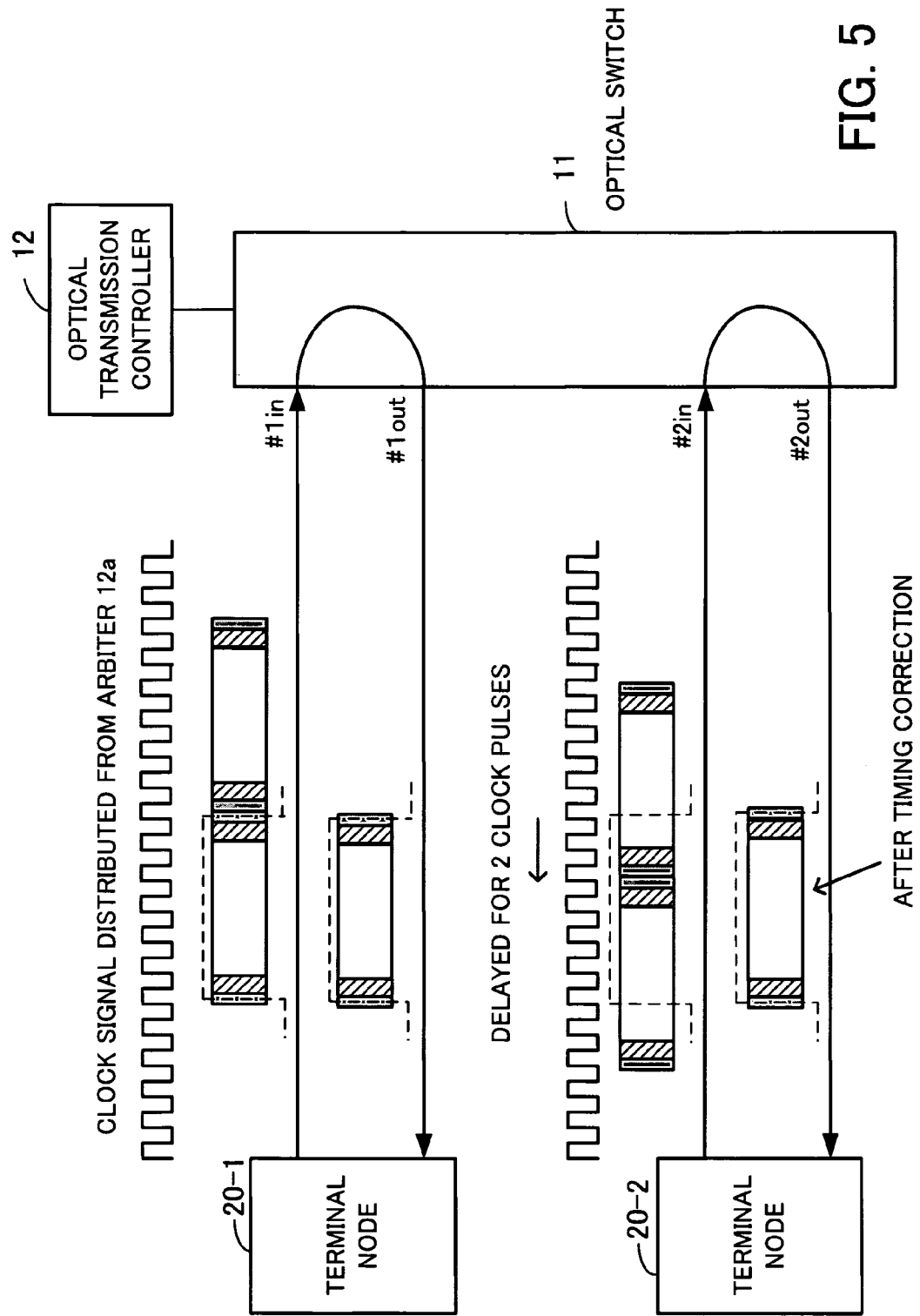
FIG. 5 illustrates time difference correction.

FIG. 5 illustrates the time difference correction. The optical switch 11 is connected with the terminal nodes 20-1 and 20-2, and the clock signal distributed from the optical transmission controller 12 is supplied to the terminal nodes 20-1 and 20-2 and the optical switch 11. Switching of input ports #1in and #2in of the optical switch 11 takes place at the same timing, and the switching timing is indicated in the figure by the dashed rectangular forms.

Upon connection with the optical switch node 10, the terminal nodes 20-1 and 20-2 each autonomously output an optical dummy packet or an optical continuous signal which is a succession of optical dummy packets. In the optical switch 11, the switching processor 11b (FIG. 1) switches the optical continuous signal or the optical dummy packet, and the switched optical dummy packet is returned to the corresponding terminal node.

(1) Time difference correction in the terminal node 20-1 (where normal switching can be effected since there is no time difference between the switching timing and the arrival timing).

On receiving the optical dummy packet switched and sent back from the optical switch 11, the time difference adjuster 20a in the terminal node 20-1 converts the optical dummy packet to a dummy packet, which is an electrical signal, and stores the dummy packet in the buffer.

Then, the time difference adjuster 20a reads out the dummy packet in accordance with the current readout timing (timing generated based on the distributed clock signal) and converts the read dummy packet to an optical signal to generate an optical dummy packet, which is then transmitted to the optical switch 11.

The optical switch 11 switches the optical dummy packet received via the input port #1in and returns the packet via the output port #1out to be looped back to the terminal node 20-1. The time difference adjuster 20a receives the thus-switched and looped-back optical dummy packet and detects synchroneity of the received packet (specifically, the optical dummy packet position detection information at the head and tail of the optical dummy packet is detected).

In the example shown in FIG. 5, the optical dummy packet is synchronized. Namely, if the time difference adjuster 20a can normally detect the optical dummy packet position detection information provided at each of the head and tail of the optical dummy packet, then it means that the optical dummy packet transmitted from the terminal node 20-1 has fitted in the switching time range of the input port #1in, inclusive of the guard time at each end of the optical dummy packet, and thus has been normally switched by the optical switch 11.

From this it follows that there is no time difference between the timing of arrival at the optical switch 11 of the optical dummy packet transmitted from the terminal node 20-1 and the switching timing of the optical switch 11, proving that in subsequent in-service operation, optical packets may be output from the terminal node 20-1 at the current readout timing.

(2) Time difference correction in the terminal node 20-2 (where normal switching cannot be effected since there is a time difference between the switching timing and the arrival timing).

On receiving the optical dummy packet switched and sent back from the optical switch 11, the time difference adjuster 20a in the terminal node 20-2 converts the optical dummy packet to a dummy packet, which is an electrical signal, and stores the dummy packet in the buffer.

Then, the time difference adjuster 20a reads out the dummy packet in accordance with the current readout timing (timing generated based on the distributed clock signal) and converts the read dummy packet to an optical signal to generate an optical dummy packet, which is then transmitted to the optical switch 11.

The optical switch 11 switches the optical dummy packet received via the input port #2in and returns the packet via the output port #2out to be looped back to the terminal node 20-2. The time difference adjuster 20a receives the thus-switched and looped-back optical dummy packet and detects synchroneity of the received packet (specifically, the optical dummy packet position detection information at the head and tail of the optical dummy packet is detected).

In the example shown in FIG. 5, the optical dummy packet is not synchronized. Namely, the optical dummy packet has been switched in a manner such that the packet fails to fit in a single switching time range and extends across the switching timing.

On detecting the asynchronism, the time difference adjuster 20a varies the readout timing until synchroneity is attained so that the optical packet may fit in the switching time range and thus can be switched normally. In the illustrated example, the optical packet fits in the switching time range if delayed for a time period corresponding to two clock pulses of the distributed clock signal, and accordingly, the transmission timing (readout timing) for the optical dummy packet is delayed for two clock pulses.

As a result, the time difference between the arrival timing at the optical switch 11 of the optical dummy packet transmitted from the terminal node 20-2 and the switching timing of the optical switch 11 can be eliminated. In subsequent in-service operation, therefore, optical packets may be output from the terminal node 20-2 in accordance with the readout timing obtained after the time difference correction.

The following describes the case where adjustment error occurs due to timeslot displacement among the optical packets transmitted from multiple terminal nodes and the switching process of the optical switch 11. In the aforementioned case, the time difference between the readout timing of a single terminal node 20 and the switching timing of the optical switch 11 is corrected. There is a possibility, however, that adjustment error occurs due to timeslot displacement among the optical packets transmitted from multiple terminal nodes and the switching process of the optical switch 11, and accordingly, such timeslot displacement also needs to be corrected within an identical system.

Figure 6:
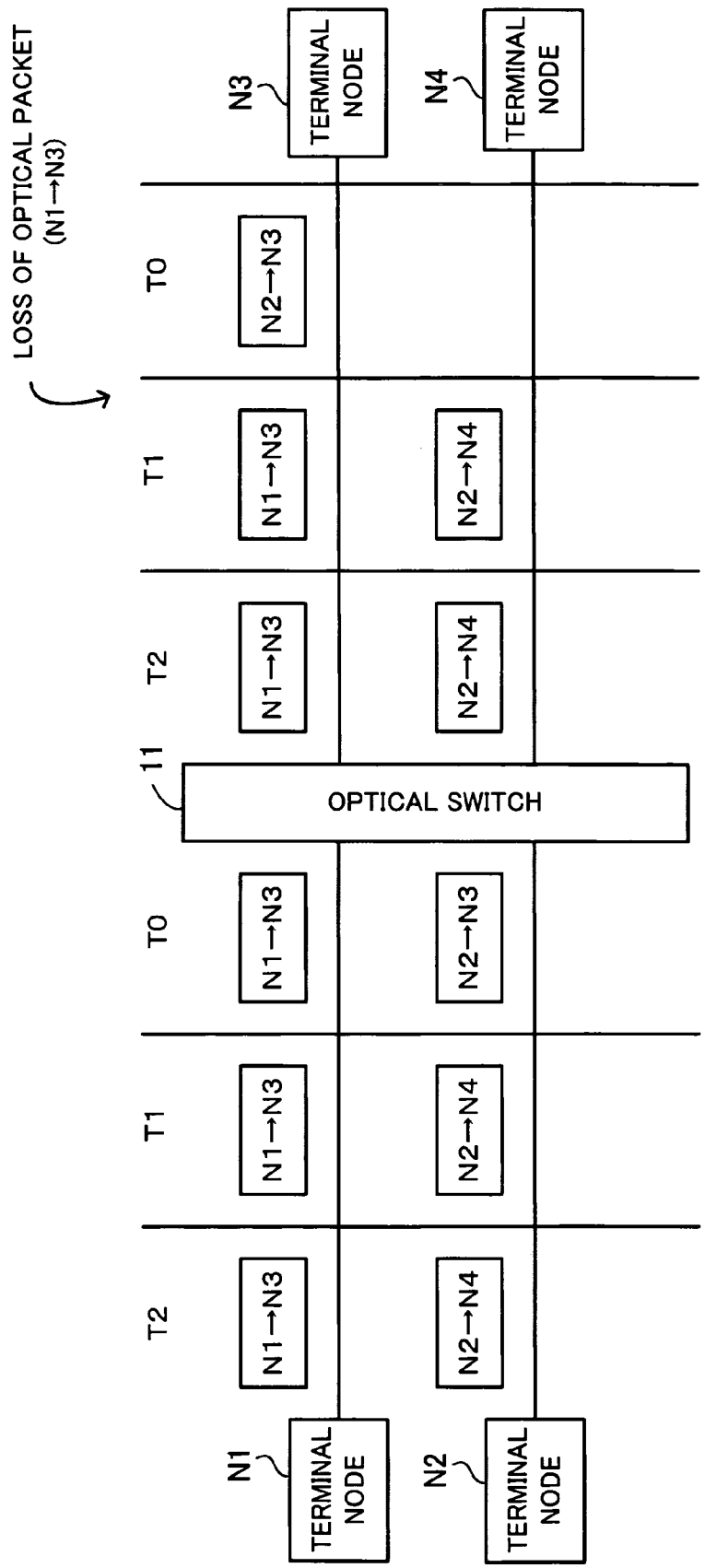
FIG. 6 illustrates error in timeslot adjustment for optical packets.

FIG. 6 illustrates the adjustment error caused by timeslot displacement between optical packets. The optical switch 11 is connected with terminal nodes N1 to N4. The terminal node N1 transmits, to the optical switch 11, optical packets addressed to the terminal node N3, and the terminal node N2 transmits, to the optical switch 11, an optical packet addressed to the terminal node N3 and optical packets addressed to the terminal node N4.

The optical switch 11 switches the received optical packets to be output to the respective destination terminal nodes. With respect to input timeslots T1 and T2, the optical packets output from the terminal node N1 are addressed to the terminal node N3 (N1→N3), and the optical packets output from the terminal node N2 are addressed to the terminal node N4 (N2→N4). Accordingly, no contention occurs during the switching process, so that the optical packets are transmitted to the respective destinations in output timeslots T1 and T2.

With respect to input timeslot T0, however, the optical packet output from the terminal node N1 is addressed to the terminal node N3 (N1→N3), and also the optical packet output from the terminal node N2 is addressed to the same terminal node N3 (N2→N3), causing contention during the switching process for this timeslot.

In the example shown in FIG. 6, the optical packet (N2→N3) is switched and output to the terminal node N3 in the output timeslot T0, whereas the optical packet (N1→N3) is lost. The arbiter 12a, to which the packet send request is transmitted from each terminal node, is originally adapted to perform arbitration control so that contention may not occur between ports, and therefore, the packet loss mentioned above is caused due to displacement of timeslots.

Accordingly, in the optical transmission system 1 of the present invention, adjustment error that may possibly be caused due to timeslot displacement among the optical packets transmitted from multiple terminal nodes and the switching process of the optical switch 11 needs to be corrected, besides the timing difference of the individual terminal nodes, explained above with reference to FIGS. 1 to 5.

Figure 7:
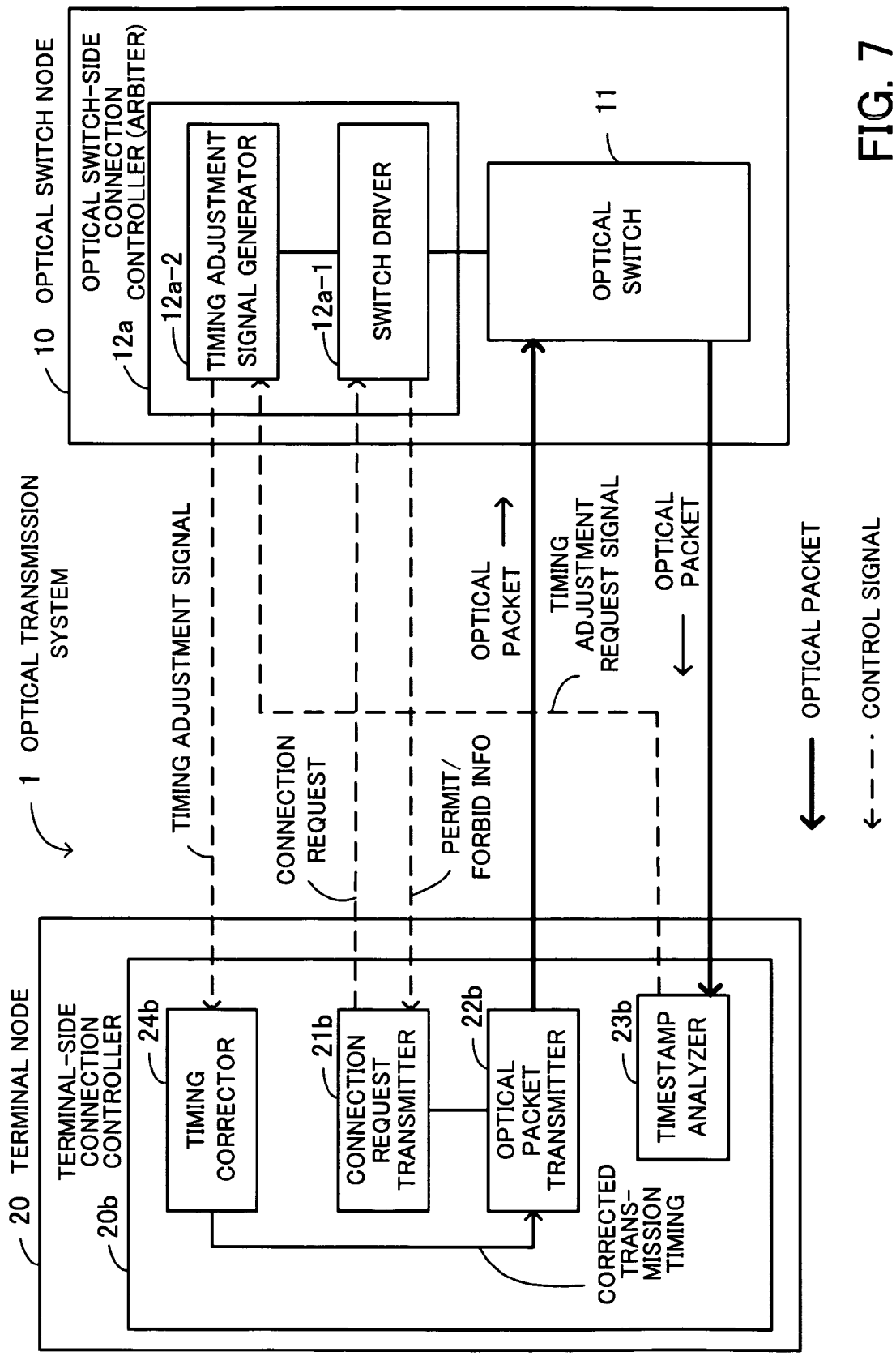
FIG. 7 shows a system configuration including the optical switch node and the terminal node.

The following describes the configuration and operation of the optical transmission system 1 capable of correcting timeslot displacement. FIG. 7 shows the configuration of the system including the optical switch node 10 and the terminal node 20. In the figure, like reference numerals refer to like elements appearing in FIGS. 1 and 3, and it is to be noted that the illustration and the explanation given below are focused on the elements necessary for correcting the timeslot displacement (namely, the elements shown in FIGS. 1 and 3 are included also in the nodes but are not illustrated in FIG. 7).

The arbiter 12a includes a switch driver 12a-1 and a timing adjustment signal generator 12a-2. The switch driver 12a-1 receives a port-to-port connection request from the terminal node 20, then determines whether to permit port connection, and transmits port connection permit/forbid information. The port-to-port connection request includes destination information indicative of the destination terminal node. Based on the destination information, the switch driver 12a-1 decides the connection route of the optical switch 11 and controls the switching operation of the optical switch 11.

On receiving a timing adjustment request signal from the terminal node 20, the timing adjustment signal generator 12a-2 generates and outputs a timing adjustment signal to the terminal node 20 which is transmitting optical packets at such transmission timing as to cause contention of the input ports of the optical switch 11.

The terminal-side connection controller 20b includes a connection request transmitter 21b, an optical packet transmitter 22b, a timestamp analyzer 23b, and a timing corrector 24b. The connection request transmitter 21b recognizes the destination node to which the optical packet is to be transmitted, and transmits the port-to-port connection request together with the destination information.

In the case where the port-to-port connection with the optical switch 11 is permitted, the optical packet transmitter 22b transmits, to the optical switch 11, the optical packet affixed with a timestamp. The timestamp analyzer 23b receives the switched optical packet and analyzes continuity of the timestamp. If it is judged as a result of the analysis that timeslot displacement has occurred between terminal nodes, the timestamp analyzer 23b transmits the timing adjustment request signal to the timing adjustment signal generator 12a-2. The timing corrector 24b receives the timing adjustment signal from the optical switch node 10 and corrects the transmission timing for optical packets.

Figure 8:
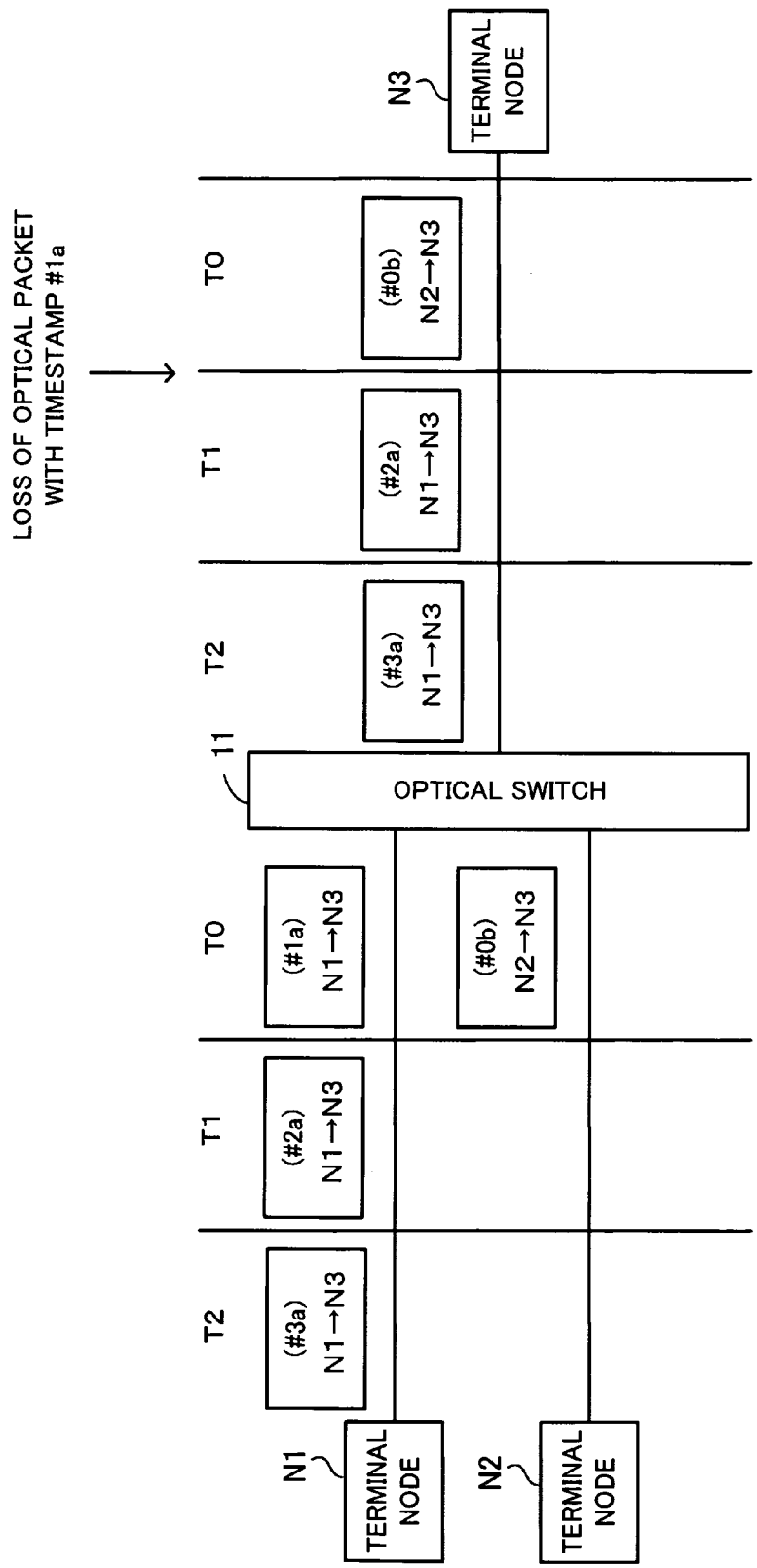
FIG. 8 shows a process of switching time-stamped optical packets.

Referring now to a specific example, operation of the system will be explained. FIG. 8 illustrates a process of switching time-stamped optical packets. The optical switch 11 is connected with the terminal nodes N1 to N3. The terminal nodes N1 and N2 transmit, to the optical switch 11, time-stamped optical packets addressed to the terminal node N3.

The terminal node N1 transmits optical packets to the optical switch 11 while affixing timestamps #0a, #1a, . . . to the respective packets. The optical packets should originally be output from the terminal node N1 such that the optical packets with the timestamps #0a, #1a and #2a arrive in the input timeslots T0, T1 and T2, respectively, but in the illustrated example, the optical packets are each transmitted one timeslot earlier than should be. Namely, the optical packet with the timestamp #1a arrives in the input timeslot T0, the optical packet with the timestamp #2a arrives in the input timeslot T1, and the optical packet with the timestamp #3a arrives in the input timeslot T2.

On the other hand, the terminal node N2 affixes a timestamp #0b to the optical packet, and this packet with the timestamp #0b arrives at the optical switch 11 in the input timeslot T0 (normal transmission).

The timestamp identifies the terminal node from which the corresponding optical packet has been transmitted (in this instance, the symbols "a" and "b" indicate the terminal nodes N1 and N2, respectively), and includes a number having continuity (the packets are numbered "0", . . . , "n", for example)

In the illustrated example, contention occurs in the input timeslot T0 because there are two optical packets addressed to the terminal node N3, and as a result, the optical packet with the timestamp #0b is output in the output timeslot T0 while the optical packet with the timestamp #1a is lost.

Figure 9:
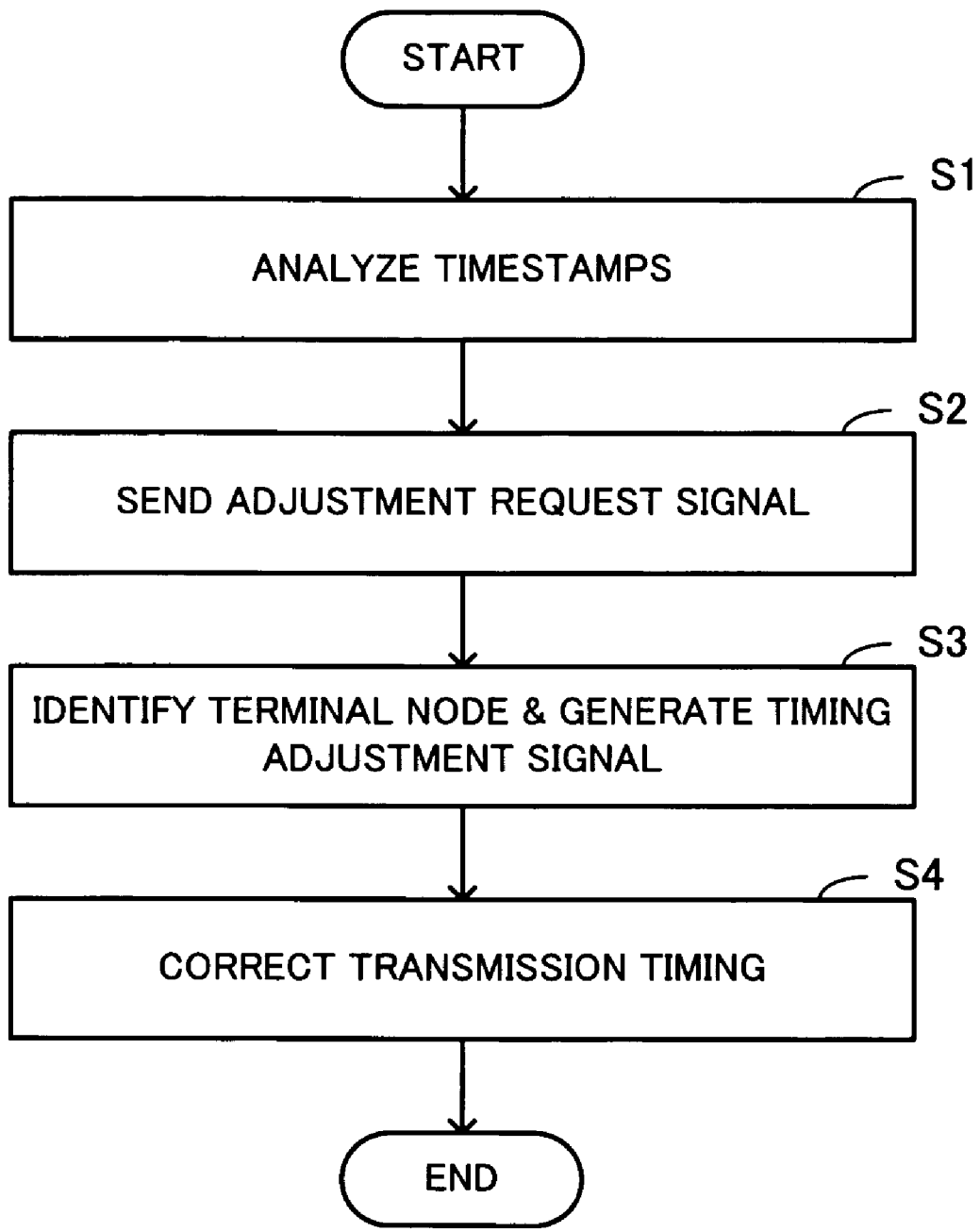
FIG. 9 is a flowchart showing a timing adjustment process.

FIG. 9 is a flowchart illustrating a timing adjustment process executed upon detection of the loss of the optical packet (N1→N3) with the timestamp #1a shown in FIG. 8.

S1: The timestamp analyzer 23b of the terminal node N3 receives the switched optical packets with the timestamps #0b, #2a and #3a, and analyzes continuity of the timestamps of these optical packets.

In this instance, the optical packet with the timestamp #2a is received subsequently to the optical packet with the timestamp #0b. The timestamp is so defined as to occur in the order "0", . . . , "n", and accordingly, the timestamp analyzer 23b judges that #1a is lost (also "a" indicates that the optical packet has been transmitted from the terminal node N1) and that timeslot displacement has occurred during the switching process for the optical packets with the timestamps #1a and #0b (i.e., in the input timeslot T0).

S2: The timestamp analyzer 23b transmits a timing adjustment request signal to the timing adjustment signal generator 12a-2 of the optical switch node 10. The timing adjustment request signal includes the identifier of the terminal node N1 whose optical packet transmission timing needs to be corrected, and the number of missing timestamps (in this instance, "1").

S3: On receiving the timing adjustment request signal, the timing adjustment signal generator 12a-2 recognizes that the node whose transmission timing needs to be corrected is the terminal node N1 and that the transmission timing needs to be corrected by one timeslot. Thus, the timing adjustment signal generator 12a-2 generates a timing adjustment signal including the number of timeslots to be corrected, and transmits the generated signal to the corresponding terminal node N1.

S4: In accordance with the received timing adjustment signal, the timing corrector 24b of the terminal node N1 corrects the optical packet transmission timing on a timeslot basis. In this instance, the transmission timing is delayed for one timeslot.

Figure 10:
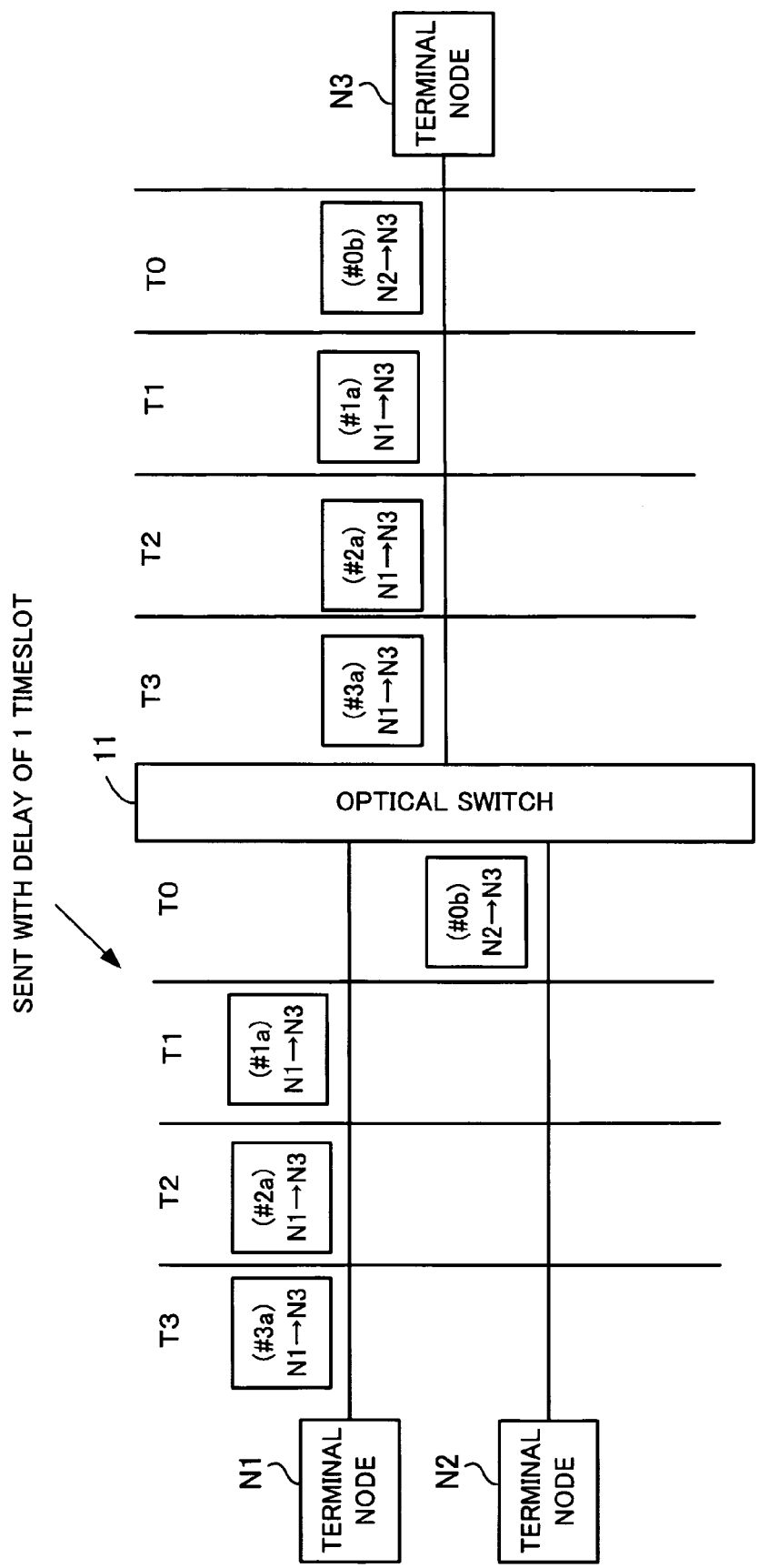
FIG. 10 shows a flow of optical packets after the adjustment of timeslot displacement.
Figure 11:
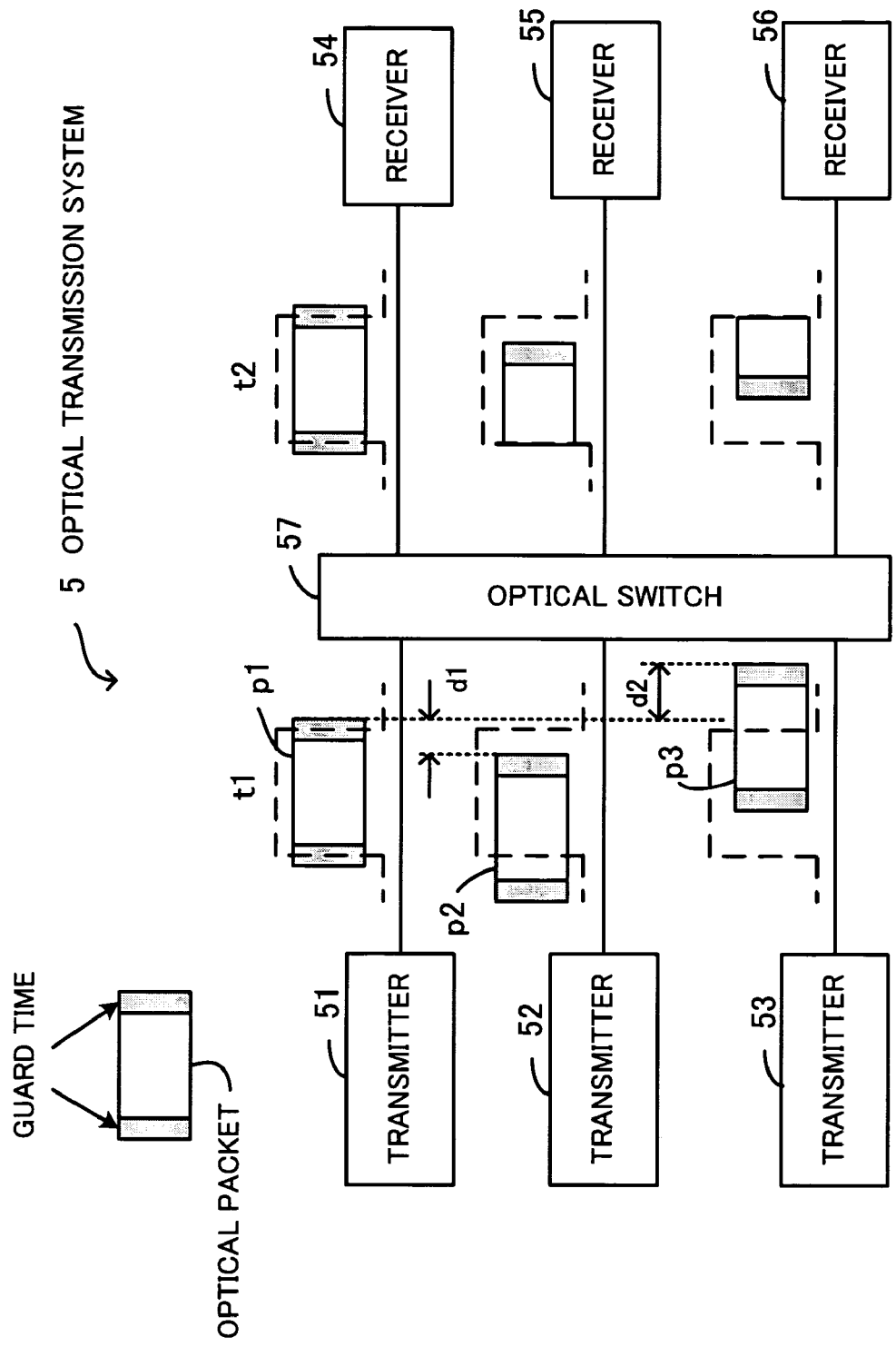
FIG. 11 illustrates a problem caused by an arrival time difference of optical packets.

FIG. 10 illustrates the flow of optical packets after the correction of timeslot displacement. The terminal node N1 transmits optical packets addressed to the terminal node N3 while delaying the transmission timing for one timeslot, compared with the current timing, as shown in the operation flow of FIG. 10. Consequently, no contention occurs in the input timeslot T0, thus enabling normal switching.

As described above, according to the present invention, the guard time between optical packets, which is needed to switch signals on the optical interconnect system, can be shortened and also communication can be performed without narrowing the effective communication bandwidth. Further, since the terminal node 20 autonomously and independently corrects the time difference upon connection with the optical switch node 10, the addition, replacement, etc. of terminal nodes can be carried out during in-service operation.

Also, in cases where contention between optical packets transmitted from multiple terminal nodes occurs in the switching process of the optical switch 11, a terminal node whose transmission timing needs to be corrected is automatically detected and effective arbitration is carried out, whereby the operability and reliability of optical packet communication can be improved.

In the optical transmission system of the present invention, the terminal node corrects a time difference between the timing of arrival at the optical switch of the optical packet transmitted therefrom and the switching timing of the optical switch, by detecting synchroneity of the optical dummy packet switched and looped back from the optical switch node and, if asynchronism is detected, varying the readout timing until synchroneity is attained, thereby correcting the time difference. Accordingly, even if the arrival time difference of optical packets is large, the time difference can be corrected without lengthening the guard time, thus making it possible to improve the transmission efficiency of optical packets.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system, comprising:
an optical switch node including a switching processor to set identical switching timing for input ports thereof such that signals input from the input ports are switched at the identical switching timing, wherein when an optical dummy packet is received, the switching processor switches the optical dummy packet at the set switching timing to be returned to an originating node which originated the optical dummy packet; and
a terminal node to transmit, during in-service operation, optical packets to the switching processor, the terminal node including:
  a dummy packet memory to generate and store a dummy packet, which is an electrical signal, during initial setting executed on connection of the terminal node with the optical switch node,
  an optical dummy packet transmitter to read out the dummy packet at readout timing from the dummy packet memory, convert the read dummy packet to an optical signal to generate an optical dummy packet, and transmit the generated optical dummy packet to the switching processor during the initial setting,
  a dummy packet receiver to receive the switched optical dummy packet and convert the received optical dummy packet to the dummy packet which is an electrical signal, and
  a time difference corrector to detect synchroneity of the switched and looped-back optical dummy packet and, upon detection of asynchronism, vary the readout timing until synchroneity is attained, thereby correcting a time difference such that the optical dummy packet is synchronized with the switching timing, and permitting the terminal node to transmit the optical packets to the switching processor by using the readout timing obtained after the time difference correction.

2. The optical transmission system according to claim 1, wherein the optical dummy packet transmitter affixes, to each of a head and a tail of the optical dummy packet, optical dummy packet position detection information by means of which synchroneity of the optical dummy packet is detected.

3. The optical transmission system according to claim 1, wherein, when the terminal node is connected with the optical switch node, the connected terminal node autonomously outputs the optical dummy packet to perform the time difference correction prior to the in-service operation, and
  wherein the time difference correction of the connected terminal node is performed independently of other terminal nodes already connected to the optical switch node.

4. The optical transmission system according to claim 1, wherein:
  the optical dummy packet transmitter transmits the optical dummy packet as part of an optical continuous signal to the optical switch node during the initial setting; and
  the switching processor samples the optical continuous signal at the set switching timing and returns an optical dummy packet sampled thereby to an originating node which originated the optical continuous signal.

5. An optical transmission system, comprising:
an optical switch node including:
  an optical switch to switch an optical packet,
  a switch driver to receive a port-to-port connection request, determine a switch connection route of the optical switch based on destination information, and control switching operation of the optical switch, and
  a timing adjustment signal generator, responsive to reception of a timing adjustment request signal, to generate and output a timing adjustment signal to a node which is transmitting an optical packet at such transmission timing as to cause timeslot displacement at an input port of the optical switch; and
a plurality of terminal nodes each including:
  a connection request transmitter to identify a destination node to which an optical packet is to be transmitted, and transmit, together with the destination information, the port-to-port connection request for connection with the optical switch,
  an optical packet transmitter to transmit the optical packet affixed with a timestamp to the optical switch,
  a timestamp analyzer to receive the switched optical packet, analyze continuity of the timestamp and, on detection of timeslot displacement as a result of the analysis, transmit the timing adjustment request signal, and
  a timing corrector to receive the timing adjustment signal and correct the transmission timing for the optical packet,
wherein:
  the terminal nodes include first and second terminal nodes and a destination terminal node,
  first and second optical packets transmitted from the first and second terminal nodes, respectively, are addressed to the destination terminal node,
  the optical switch in the switch node switches the first and second optical packets to the destination terminal node,
  the timestamp analyzer of the destination terminal node operates, in response to reception of the switched first and second optical packets, to analyze continuity of the timestamps affixed to the first and second optical packets and to output the timing adjustment request signal upon detection of timeslot displacement,
  the timing adjustment signal generator operates, in response to reception of the timing adjustment request signal, to output the timing adjustment signal for correcting transmission timing displacement, to the first or second terminal node whose optical packet transmission timing is displaced on a timeslot basis, and
  the timing corrector of the first or second terminal node corrects the optical packet transmission timing on a timeslot basis, in accordance with the received timing adjustment signal.

6. The optical transmission system according to claim 5, wherein the timestamp analyzer identifies a node showing non-continuity of the timestamp, as a destination node whose optical packet transmission timing is displaced on a timeslot basis, and includes, in the timing adjustment request signal to be transmitted, an identifier of the identified destination node and a number of missing timestamps.

* * * * *